W. WENDERHOLD.
FILM ADVANCING MECHANISM.
APPLICATION FILED JULY 20, 1915.

1,263,496.

Patented Apr. 23, 1918.
2 SHEETS—SHEET 2.

WITNESSES:

INVENTOR
William Wenderhold

UNITED STATES PATENT OFFICE.

WILLIAM WENDERHOLD, OF NEW YORK, N. Y., ASSIGNOR TO CRU PATENTS CORPORATION, A CORPORATION OF NEW YORK.

FILM-ADVANCING MECHANISM.

1,263,496.

Specification of Letters Patent.

Patented Apr. 23, 1918.

Application filed July 20, 1915. Serial No. 40,980.

*To all whom it may concern:*

Be it known that I, WILLIAM WENDERHOLD, a citizen of the United States, residing at New York city, in the county and State of New York, have invented certain new and useful Improvements in Film-Advancing Mechanism, of which the following is a clear, full, and exact description.

This invention relates to motion picture apparatus and more particularly to the intermittent film feed mechanism.

The object of my invention is to provide an intermittent movement of high speed action with the least amount of wear and noise at the time when the intermittent shaft is being engaged.

To accomplish the objects of my invention, I provide a continuously rotating bearing for the intermittent shaft so that the intermittent shaft is continuously carried therein, thereby assisting the cam groove that acts to advance the intermittent shaft and greatly reducing the amount of power necessary to move the intermittent shaft at a high speed. This rotary bearing is one of the chief improvements in my device.

A further object of my invention is to provide a cam groove to guide the member carried by the rotating shaft which engages the intermittent shaft, and by this cam groove I can guide the engaging member so that it becomes fully engaged with the intermittent shaft before imparting any movement to said intermittent shaft. By means of this cam groove I can also obtain various ratios of time during which the movement of the intermittent shaft is to take place, and I also provide an oscillating guide for the engaging member to keep the engaging member always in alinement with the center of the intermittent shaft.

Referring to the drawings.

Figure 1:
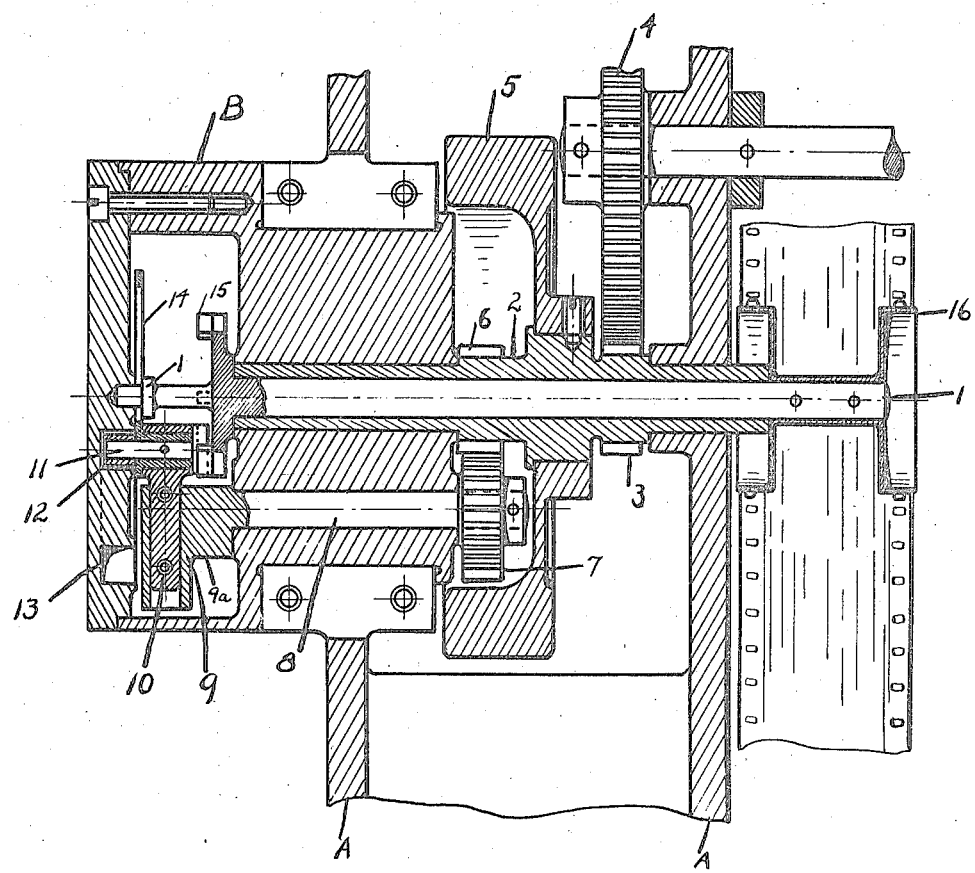
Figure 1 is a vertical section through the device.
Figure 2:
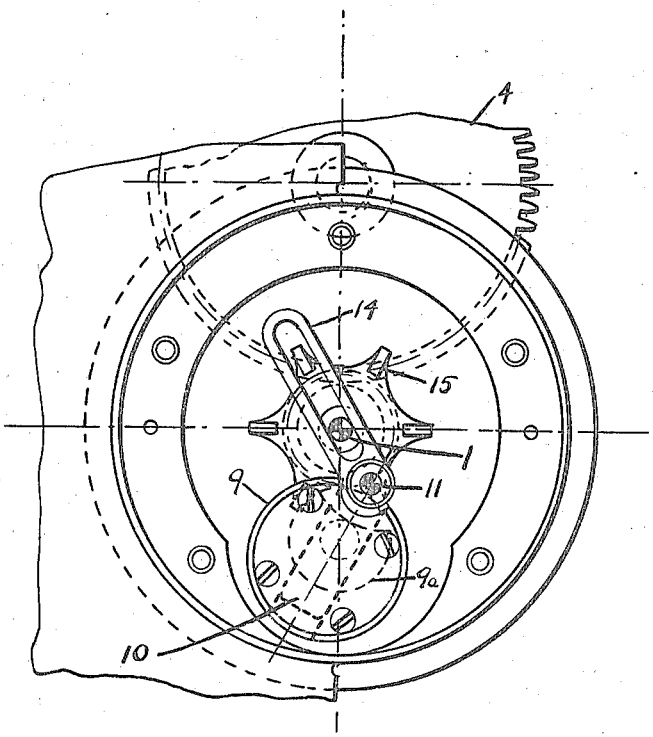
Fig. 2 is a side view thereof.
Figure 3:
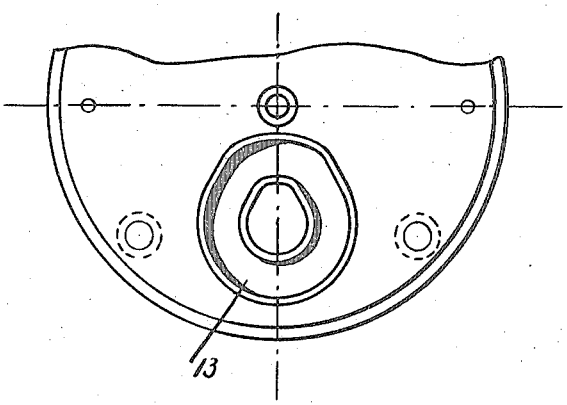
Fig. 3 illustrates the cam groove.

As shown by the drawings, the intermittent shaft 1 is carried by the rotary bushing 2, said bushing being driven by gears 3 and 4, which bushing also carries a fly wheel 5. The gear 6 is also fastened on the rotary bushing 2 and engages gear 7 on the continuously running shaft 8, which is an extension of the arm 9. In this arm a member 10 is slidably mounted, which member 10 carries the pin 11. The pin 11 carries on one end thereof the roller 12 to engage in the cam groove 13, and the pin 11 also carries the oscillating slide 14 on the other end of pin 11. I provide a groove in pin 11 to engage the projections 15 on the intermittent shaft. The eccentric surface 9$^a$ (shown also by the dotted lines in Fig. 2) locks the intermittent shaft during the rest period, which is similar to the well known lock means used in the Geneva movement. The intermittent shaft 1 also carries the film advancing sprocket 16. The cam groove 13 is preferably formed in the revoluble frame B. This frame can be shifted around its axis, which is also the center point of the intermittent shaft, and all contacts of motion remain intact while such shifting takes place, and, therefore, by this movement the position of the film relative to the optical axis of the motion picture apparatus can be adjusted, which operation is commonly called framing the picture in the aperture.

When the arm 9 is rotated, the member 10 must travel with it around its axis, but since it also engages the cam groove 13, the sliding member 10 will slide in or out of the arm 9 as the cam groove 13 directs the roller 12 on pin 11. The member 14 will go with the member 11 and slide on the end of shaft 1.

What I claim as my invention is:

1. An intermittent motion mechanism comprising a hollow shaft, a second shaft mounted in said hollow shaft, means for continuously rotating said hollow shaft, and means operated thereby for intermittently rotating said second shaft.

2. An intermittent motion mechanism comprising a hollow shaft, a second shaft mounted in said hollow shaft, a third shaft, means for continuously rotating said hollow shaft, means operated thereby for continuously rotating said third shaft, and means operated by said third shaft for intermittently rotating said second shaft.

3. An intermittent motion mechanism comprising a hollow shaft, a second shaft mounted in said hollow shaft, a third shaft, an arm mounted on said third shaft, and connections between said arm and said second shaft to impart intermittent rotation thereto when said third shaft is rotated, means for continuously rotating said hollow shaft, and means rotated thereby for continuously rotating said third shaft.

4. An intermittent motion mechanism comprising a hollow shaft, a second shaft, mounted in said hollow shaft, a third shaft, an arm mounted on said third shaft, a cam groove in engaging relation with said arm and said second shaft, and means for rotating said hollow and said third shafts.

5. An intermittent motion mechanism comprising a hollow shaft, a second shaft mounted in said hollow shaft, means for continuously rotating said hollow shaft, and means operated thereby for intermittently rotating said second shaft, and means for adjusting the position of said hollow shaft.

6. An intermittent motion mechanism comprising a hollow shaft, a second shaft mounted in said hollow shaft, a third shaft, means for continuously rotating said hollow shaft, means operated thereby for continuously rotating said third shaft, and means operated by said third shaft for intermittently rotating said second shaft and means for adjusting the position of said hollow shaft.

7. In an intermittent motion mechanism, a shaft, a rotating support therefor, and connections between said rotating support and said shaft for imparting an intermittent motion to said shaft.

8. A mechanical movement comprising a rotating driving member having a pin thereon, a driven member in the path of the pin and adapted to be intermittently rotated thereby, and a fixed member for engaging the pin and giving it a movement eccentric to the movement of the driving member.

9. A mechanical movement comprising a driving member adapted to continuously rotate, a slide on the driving member, a pin carried by the slide, means for moving the slide while the driving member is rotating, a driven member adapted to be engaged by the pin and thus adapted to be intermittently rotated.

Signed at New York city, N. Y., this 17th day of July, in the year one thousand nine hundred and fifteen.

WILLIAM WENDERHOLD.

Witnesses:
ALBERT BAUZHAF,
ROBERT RICHTER.